United States Patent [19]
Lee et al.

[11] Patent Number: 5,198,035
[45] Date of Patent: Mar. 30, 1993

[54] CORN WET MILLING PROCESS FOR MANUFACTURING STARCH

[75] Inventors: Chie-Ying Lee, Milford; Robert W. Honeychurch, Stamford, both of Conn.

[73] Assignee: Dorr-Oliver Incorporated, Milford, Conn.

[21] Appl. No.: 677,072

[22] Filed: Mar. 29, 1991

[51] Int. Cl.$^5$ .................................. C08B 30/08
[52] U.S. Cl. ............................ 127/67; 127/65
[58] Field of Search ........................ 127/67, 65

[56] References Cited

U.S. PATENT DOCUMENTS

| | | | |
|---|---|---|---|
| 2,437,036 | 3/1948 | Murer et al. | 127/67 |
| 3,595,696 | 7/1971 | Vegter | 127/23 |
| 4,144,087 | 3/1979 | Chwalek et al. | 127/67 |

Primary Examiner—Theodore Morris
Assistant Examiner—P. L. Hailey
Attorney, Agent, or Firm—Harold M. Snyder

[57] ABSTRACT

High-rate washing centrifuges are employed in a corn wet milling process to accomplish displacement washing of the starch and a sharp classification into starch and gluten.

8 Claims, 4 Drawing Sheets

CORN WET MILLING PROCESS FOR MANUFACTURING STARCH

FIELD OF THE INVENTION

This invention is directed to improvements in the manufacture of starch by the wet method and, more particularly, to an improvement in the Starch-Gluten Separation Station in that method whereby heightened washing action and sharp classification is achieved.

BACKGROUND OF THE INVENTION

The modern process of starch wet milling is a series of independent classifications and separations integrated into a single balanced process in which a combination of centrifuges and hydrocyclones are commonly employed to separate product components including germ, fiber, gluten, starch and soluble solids. A great many flow arrangements have been employed over the years, but most users now have basically similar systems utilizing a countercurrent flow of water to the starch fraction. Such a starch wet milling system requires the following treatment stations:

A. Steeping and Germ Separation
B. Fiber Washing and Dewatering
C. Starch-Gluten Separation
D. Starch Washing and Thickening Each of the product components reports as the product of its respective station with the exception of the soluble solids which "fall out" during steep water evaporation.

The starch consists of spherical granules about 10–15 microns in diameter having a density of about 1.5. The gluten is a flocculant structure of 1–3 microns having a density of about 1.2.

Evaporation of the steep water is carried out to obtain the soluble solids therein in the form of a heavy liquor which is mixed with other products of the process, such as fiber, and dried for use as animal feed.

In the Steeping and Germ Separation Station the corn kernels are first steeped for softening and then cracked in a mill to release the germ. The germ contains the valuable corn oil and is separated from the magma of starch, hulls and fiber in the overflow of a hydrocyclone stage. The germ is washed in washing screens and then exits the system. The essentially germ-free hydrocyclone underflow reports to the Fiber Washing and Dewatering Station.

The Fiber Washing and Dewatering Station includes a grit starch screening stage in which more than half the free starch is removed as undersize and forwarded to the Starch-Gluten Separation (Centrifugation) Station described below. The oversize from the grit starch screening stage is forwarded to a refining mill and then to a plurality of screen stages arranged for countercurrent washing of the fiber with the starch reporting as undersize at a density of 5°Be to 6°Be to the Starch-Gluten Separation Station. The fiber leaves the system at this point reporting to a centrifuge for dewatering and is subsequently dried.

The Starch-Gluten Separation Station accepts the underflow from the grit starch screens and separates the starch from the gluten. The main starch-bearing stream is forwarded to the Starch Washing and Thickening Station while the gluten is forwarded to thickening and drying. Clarified water (free of insoluble solids) is provided by the Starch-Gluten Separation Station for the steeps as is process water (low in solubles) for use in various stages of the system. There is also a recycle stream containing solubles, insolubles and some starch that is sent to the Fiber Washing and Dewatering Station.

The Starch-Gluten Separation Station commonly includes a plurality of centrifuges of the disc nozzle type, the first of which is the Mill Stream Thickener which accepts the feed stream from the grit starch screens underflow and thickens it to a concentration of 9°Be to 12°Be. This thickened stream is forwarded as feed to the Primary centrifuge (a centrifuge accomplishing separation of starch and gluten) into which a wash liquid may be introduced in a wash liquid/draw-off volume ratio of 0.1 to 0.5, the draw-off being the amount of thickened slurry leaving the Primary centrifuge. A wash/liquid draw-off volume ration of 0.5 approximates the maximum ratio formerly attainable with available centrifuges in the corn wet milling process. The volume of wash liquid addition improves the protein (gluten) recovery from 35±10% to a maximum of 50±10%.

The low protein recovery of the primary separator, especially when using larger size disc-nozzle centrifuges, causes protein to build up in the system and increases the runaround inside the loop including the fiber washing stages and the starch washing stages. A tight control on underflow density of the washing stages is a necessity in order to meet the finished starch quality requirement (less than 0.3% protein).

In the corn wet milling process, there are many advantages from the process, economic and operational points of view to be derived from an improvement in protein recovery to as close to 100% as possible in the primary stage, and by avoiding protein accumulating and recycling in the process flows.

The Starch Washing and Thickening Station is a multiple-stage countercurrent washing system using hydrocyclones which remove solubles together with the remaining insoluble protein and fine fiber in the feed stream as the final starch product is concentrated. The overflow stream from the Starch Washing and Thickening Station has the lowest soluble solids concentration of any stream in the process (except fresh wash water) and is returned to the Starch-Gluten Separation Station as process water. A system of the type described above is outlined in detail in an article entitled "Integrated Starch Wet Milling Process" by T. H. Bier, J. C. Elsken and R. W. Honeychurch, published in Die Starke 26 Jahrg. 1974/No. 1, Pgs. 23–28.

In co-pending U.S. patent application Ser. No. 612,044 for "High-Rate Washing Centrifuge", filed Nov. 13, 1990, there is disclosed an improved disc-nozzle centrifuge with structure permitting the introduction of very much larger amounts of wash liquid into the centrifuge than had been possible heretofore. Wash liquid in volume of from over 0.5 to 3 times the underflow draw-off volume is introduced directly into the rotor/separation chamber of the centrifuge simultaneously with the return flow of recycled underflow and results in displacement washing of the feed. The liquid originally associated with the feed is largely displaced to the overflow.

In addition to the washing function, substantial improvement in classification of solids is effected due to the high rate of return flow and wash liquid into the separation chamber. The high upflow wash elutriates the bed of solids within the rotor/separation chamber and lifts the fines out of the fluid bed and sweeps them to the overflow.

The disclosure of application Ser. No. 612,044 is incorporated herein by reference.

It is an object of the invention to provide a starch wet milling process which incorporates an improved Starch-Gluten Separation Station and process.

It is a further object of the invention to utilize the high-rate washing centrifuge in the Starch-Gluten Separation Station of the starch wet milling process to obtain improved washing of the starch and a sharp classification into starch and gluten.

SUMMARY OF THE INVENTION

In the present invention, the countercurrent flow of water and starch is maximized by routing the starch-gluten feed stream from the Fiber Washing and Dewatering Station through one or more high-rate washing centrifuges. Primary separation of the gluten and starch is effected by the high-rate washing centrifuges. The mill stream thickening centrifuge of the prior art is eliminated. The protein (gluten) recovery improves by about 20%.

The wash water utilized in these high-rate washing centrifuges provides a wash liquid/draw-off volume ratio of substantially more than 0.5. In the process of this invention the wash liquid/draw-off volume ratio is at least 1.0 and in the range of 1 to 2, with a preferred ratio of 1.5. Providing this excess of wash water over the draw-off volume results in a high net flow of wash water inward toward the center of the centrifuge rotor. The inward wash stream "lifts" the insoluble gluten (protein) away from the starch by changing the sedimentation conditions so that the (relatively small) difference in density of the heavier starch and the lighter gluten is emphasized (magnified) by having a powerful liquid current flowing inward whereas a strong gravitational (centrigugal) force is exerted outward. The rotors spin at a high RPM, say 2700 RPM, generating a higher G-force (up to 2600 G) as opposed to 1500 G formerly available. The high RPM's and G-force generated compensate for the very high liquid flow volumes that must be handled for the process to have strong economic advantage over previous practice.

In the process of the invention all of the wash water moves forward countercurrent against the flow of the starch solids and the gluten is decisively separated due to the strong upflow of the wash stream. Previously, the upflow elutriation phenomenon was not recognized as being practical in the corn wet milling process. The wash stream in the present invention elutriates the insoluble protein free of the starch granules and carries the gluten out the overflow. The soluble protein is similarly blocked and removed. As a result, the underflow will approach a 1.0% upper limit for insoluble protein, for example.

The invention effects improved utilization of wash water to accomplish an important objective more efficiently; that is, less water is required to block the solubles.

DETAILED DESCRIPTION

Figure 1:
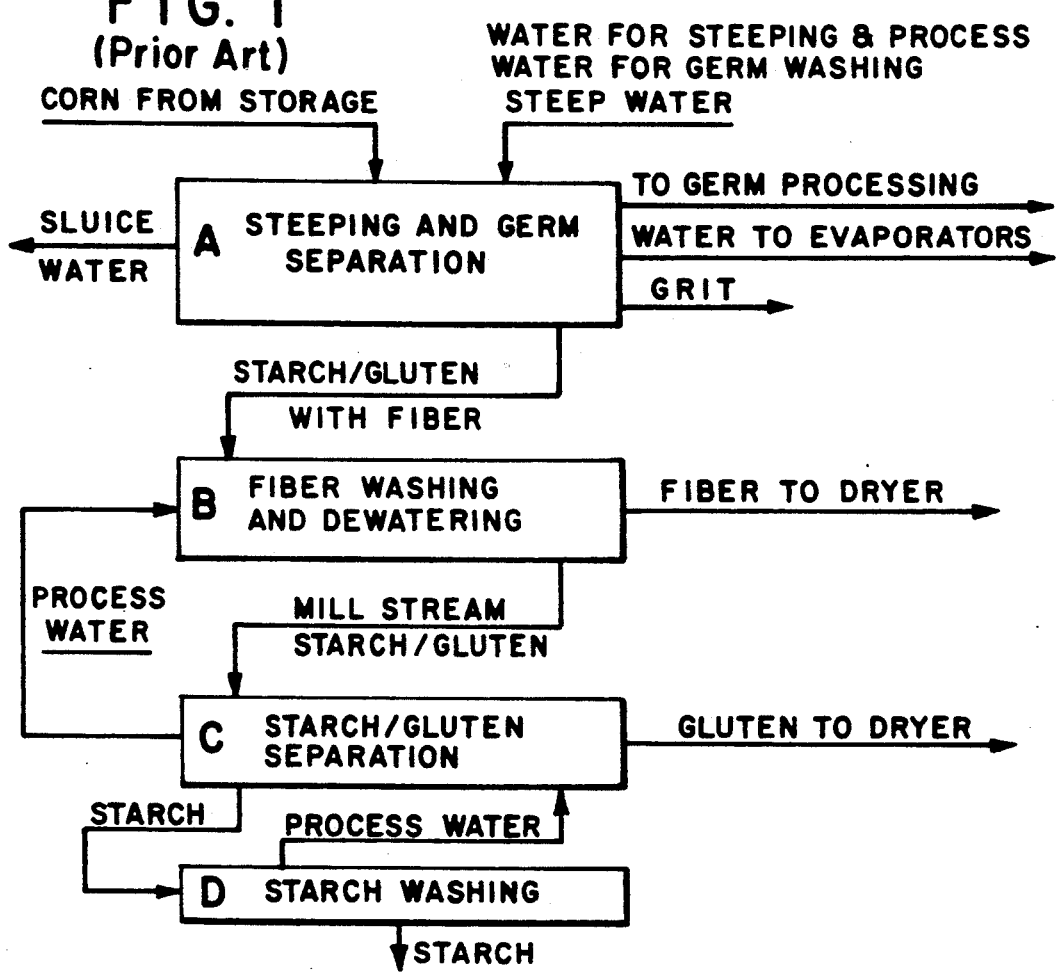
FIG. 1 is a block diagram of the starch wet milling process with the flows between the several stations shown.

In the block diagram of FIG. 1 showing the starch wet milling process, the letter "A" marks the Steeping and Germ Separation Station in which shelled corn and steeping water are admitted and steeping is carried out to soften the kernels which are then screened and cracked in an attrition mill freeing the germ. Steep water is drawn off and routed to evaporators for recovery of soluble substances. The germ is separated and washed in this Station and then leaves this process for further treatment. A starch-rich underflow stream from the Germ Separation Station passes to the next Station in the process.

The starch-rich stream from Station A is passed to the Fiber Washing and Dewatering Station (Station "B") where the starch milk (fiber starch) is separated from the coarse and fine fiber by multistage screening and countercurrent washing. The fibercontaining overflow from this screening and washing operation is dewatered and exits the process for fiber drying. The starch and gluten-containing underflow is forwarded to the Starch-Gluten Separation Station "C".

In Station "C" the starch is centrifugally separated from the gluten. The gluten is thickened and exits the process. The starch slurry underflow of the centrifuges is forwarded to the Starch Washing and Thickening Station "D".

In Station "D" countercurrent washing of the starch slurry takes place in multiple hydrocyclones to remove any remaining soluble and insoluble protein with the underflow constituting the starch product.

Figure 2:
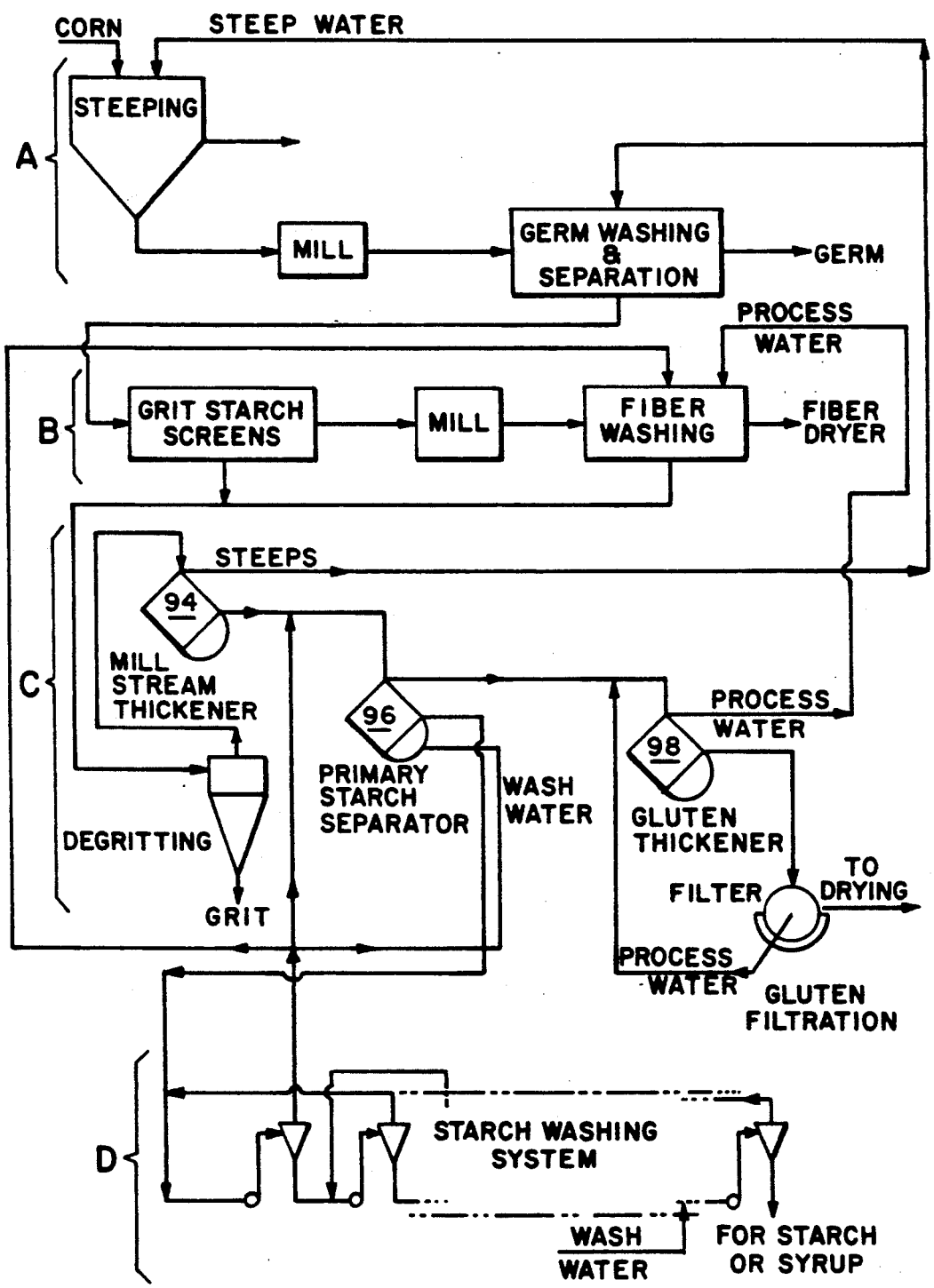
FIG. 2 is a flow diagram in greater detail of a prior art process carrying out the process shown in the block diagram of FIG. 1.

FIG. 2 is a detailed representation of the prior art starch wet milling process disclosed in U.S. Pat. No. 4,207,118, owned by the assignee of the present invention. Attention is particularly directed to the Starch-Gluten Separation Station "C" illustrated. It should be noted that the mill stream from the Fiber Washing and Dewatering Station "B" is directed to the non-washing mill stream thickener centrifuge 94 for preliminary thickening before the underflow is subjected to the starch-gluten separation in the primary starch separator 96. While the primary starch separator does have a washing function, the ratio of wash liquid to draw-off volume never exceeds about 0.5, since that was the capability of available centrifuges. The gluten-containing overflow passes to a non-washing gluten thickening centrifuge 98 while the starch-rich underflow is forwarded to the starch washing system "D".

Figure 3:
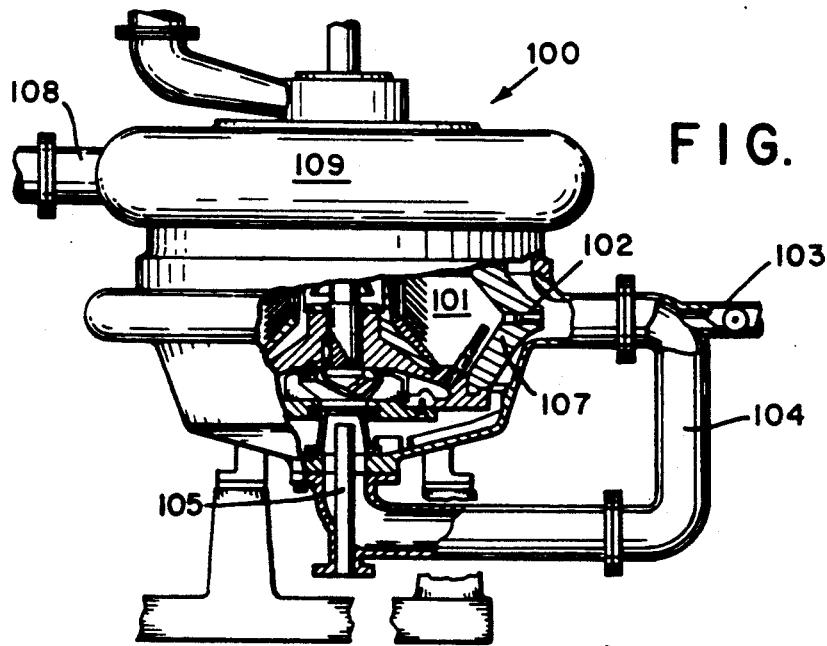
FIG. 3 is a view in section of a high-rate washing centrifuge of the type utilized in the Starch-Gluten Separation Station of this invention.

FIG. 3 shows the high-rate washing centrifuge 100 used in the process of the invention. A rotor 107 is driven in rotation at high speed forcing the liquid/solid material in rotor/separation chamber 101 through nozzles 102 into underflow pipe 103. A portion of the underflow is returned to rotor/separation chamber 101 through recycle line 104. A large volume of wash liquid is introduced into the rotor/separation chamber simultaneously with recycled underflow through wash line 105. The overflow moves upward to chamber 109 of the centrifuge and exits therefrom through pipe 108.

Figure 4:
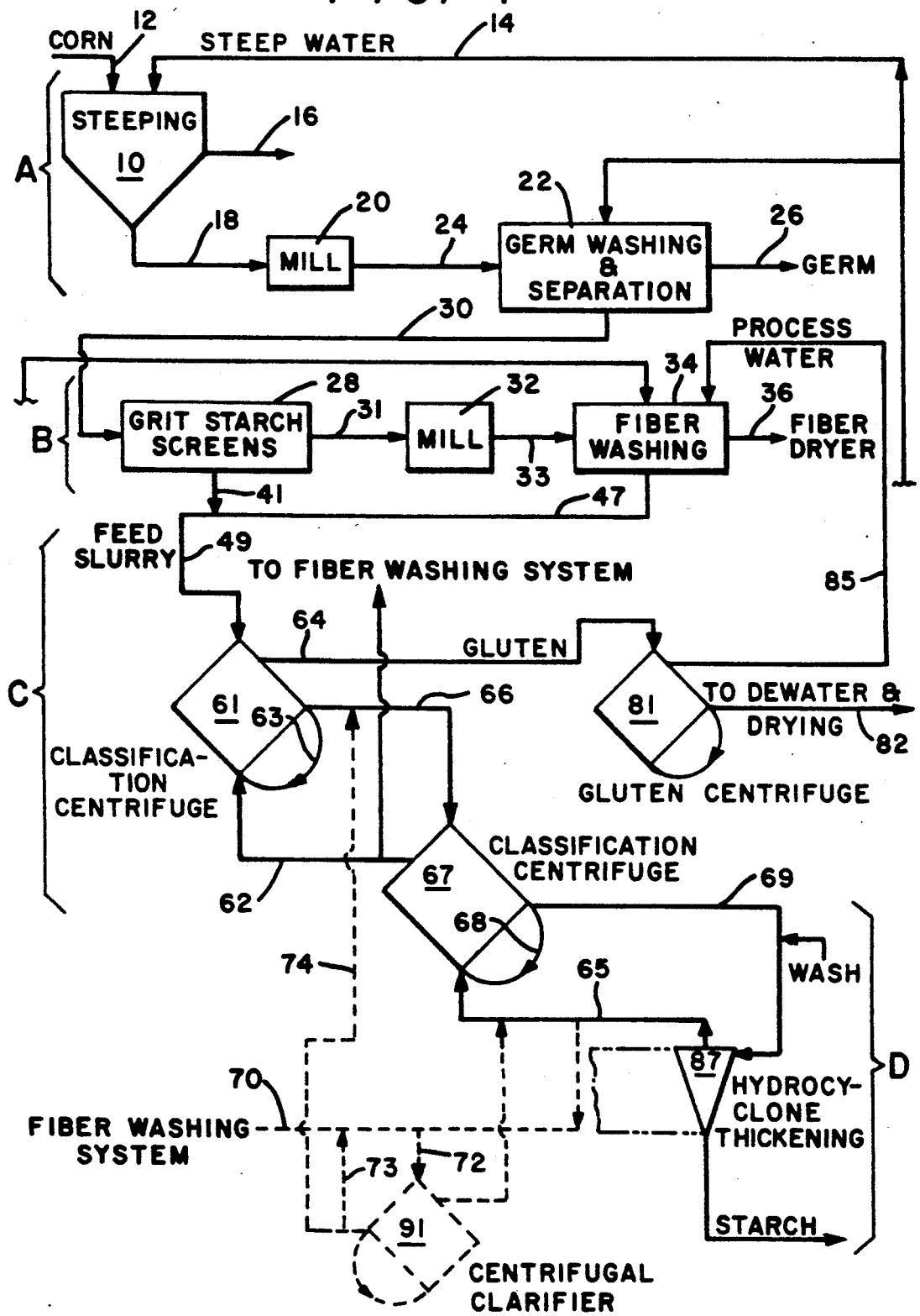
FIG. 4 is a flow diagram similar to FIG. 2 which includes the novel Starch-Gluten Separation Station of the present invention.

In FIG. 4 the flow diagram represents the starch wet milling process of the invention comprising the Steeping and Germ Separation Station "A", the Fiber Washing and Dewatering Station "B", the Starch-Gluten Separation Station "C" and the Starch Washing and Thickening Station "D". The numeral 10 designates one of the tanks of the steeping system which ordinarily consists of a plurality of steeping tanks arranged for countercurrent operation. The shelled corn is fed to tank 10 through line 12 and steeping water or acid is introduced into the steeping tank through line 14, and the steep water is drawn off through conduit 16 and sent to the evaporator (not shown) for recovery of soluble substances. The steeped corn from the tanks 10 is then passed via a conduit 18 to an attrition mill 20 to break up the steeped corn and to free the germ. From the attrition mill 20 the milled steeped corn is passed through conduit 24 to a germ washing and separation stage 22 where the germ is separated and passed by a conduit 26 to a germ processing station (not shown) where it is screened, washed, dewatered, dried and the oil recovered. The underflow from the germ separation stage 22 is conducted via conduit 30 to the grit starch screens 28 where it is screened to remove the starch, commonly called grit starch, released in the milling operation 20. The grit screen tailing from the grit starch screens 28 are conducted via a conduit 31 to Buhr mills 32 or other suitable disintegrators. From the mills 32 the ground grit screen tailings are passed by conduit 33 to a screening and washing station 34 where the starch milk (fiber starch) is separated from the coarse and fine fiber by multistage screening and countercurrent washing. The fiber-containing overflow from the screening and washing station is conducted by conduit 36 to a processing station (not shown) for drying and/or further processing.

Conduit 41, which conducts the grit starch from the grit starch screens 28, joins conduit 47, conducting the fiber starch from the Fiber Washing stage 34, with the combined flows in conduit 49 forming the feed slurry to Station C. The feed slurry may contain from 5% to 15% protein (gluten) with approximately 8% protein on a dry basis. The feed slurry at a density of from 6°Be to 12°Be, and usually about 7.5°Be, is introduced into the high-rate washing classification centrifuge 61 as a strong flow of wash liquid (a wash liquid/draw-off volume ratio in the range 1 to 2) is injected into the centrifuge through conduit 62. The purpose in having more wash water than draw-off is to have a high net flow of wash water inward towards the center of the rotor. This inward wash stream will "lift" the insoluble gluten away from the starch by changing the sedimentation situation so that the difference in density of the heavier starch and lighter gluten is emphasized (magnified) by having a powerful liquid current flowing inward whereas a strong gravitational (centrifugal) force is exerted outward. The sloping surfaces of the rotor bowl walls and the discs serve to positively reinforce this separating action on the two insoluble fractions with their widely different sedimentation characteristics. The net reversal in flow direction will prevent the hindered settlement action and improve the heavy media effect and give the beneficial result of a lower gluten concentration in the underflow water phase than the gluten concentration in the overflow. The centrifuge 61 has provision for recycle of a portion of the underflow through return line 63. A gluten-rich overflow stream leaves the centrifuge 61 through conduit 64 to enter a gluten-thickening non-washing centrifuge 81. With the introduction of the proper amount of wash water and control of other operating conditions, protein recovery close to 100% can be achieved. In centrifuge 81 the gluten-rich underflow leaves the process through conduit 82 for dewatering while the overflow stream is sufficiently low in solubles that it can serve as process water elsewhere in the process, passing through line 85.

The starch-rich underflow from centrifuge 61 passes through conduit 66 to enter a second high-rate washing classification centrifuge 67 into which is injected through conduit 65 a strong flow of wash liquid amounting to more than 100% of the draw-off volume. The overflow stream from centrifuge 67 constitutes the wash liquid which is injected into centrifuge 61 through conduit 62. A portion of the underflow of centrifuge 67 is recycled through return line 68 for injection into the centrifuge with the wash liquid from conduit 65. The starch-rich underflow from centrifuge 67, at a density of from 14°Be to 22°Be, passes through conduit 69 to the Starch Washing and Thickening Station D (with insoluble protein reduced to about 0.5%) where the final starch product is concentrated in a series of hydrocyclones. This hydrocyclone washing can be accomplished in from one to six stages (one stage indicated at 87), preferably three stages. This contrasts with contemporary systems in which twelve stages of hydrocyclone washing are customary. Using 10 mm hydrocyclones a further concentration of the starch to as much as 25°Be is effected. The greatly reduced number of hydrocyclone washing stages required is due to the very effective washing accomplished in the high-rate washing centrifuges of the Starch-Gluten Separation Station C. The overflow stream of the hydrocyclones constitutes the wash liquid for centrifuge 67 and passes thereto through conduit 65.

Alternatively, part of the hydrocyclone overflow can be routed back to the fiber washing system through line 70 (dotted) and, as a further alternate, this portion of the overflow (by diversion through line 72 (dotted line) can be thickened in a non-washing clarifier centrifuge 91 (dotted line showing) so that only a solids slurry moving through line 72 (dotted line) returns for rescreening and the full wash stream is still available for use in the high-rate washing centrifuge separation system.

A further alternate is to send all or some of this slurry back (through line 74) to the second stage high-rate washing centrifuge separator.

The overflow of the first stage high-rate washing centrifuge contains the entire gluten stream and it proceeds to a similarly sized non-washing centrifuge 81 that is configured for thickening only.

The invention has been described above in an embodiment employing two stages of high-rate washing centrifuges with subsequent thickening and washing accomplished in hydrocyclone stages. It has been noted that, due to the excellent thickening and washing performance obtained with these centrifuges, the number of hydrocyclone thickening and washing stages can be reduced from the customary twelve stages to six or fewer stages. It will be understood that the thickening and washing functions may be entirely or almost entirely accomplished by three or more high-rate washing centrifuge stages. With three or more such high-rate washing centrifuge stages the need for additional thickening and washing in hydrocyclones is rendered very nearly or completely superfluous.

Figure 5:
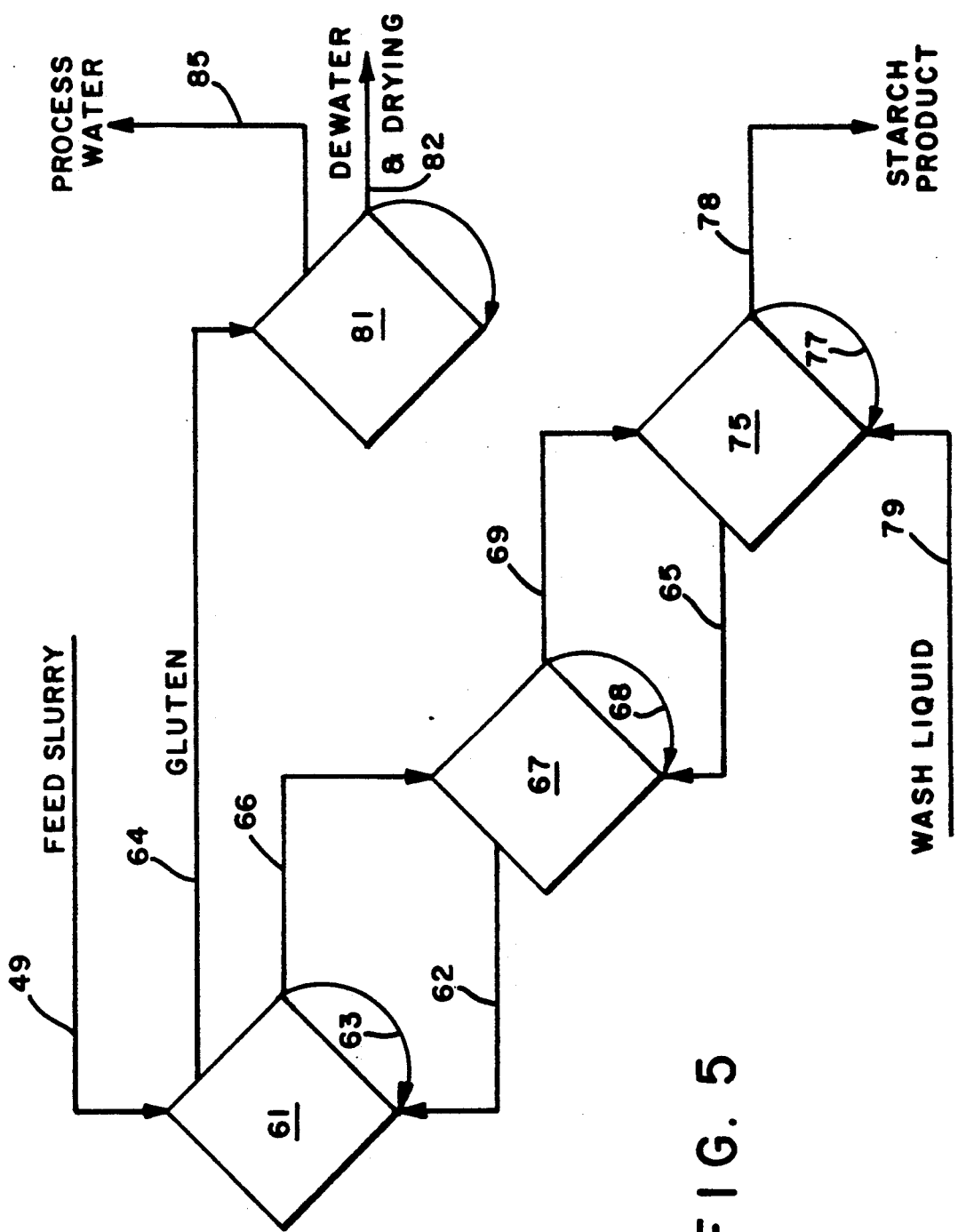
FIG. 5 is a flow diagram of an alternate embodiment of a Starch-Gluten Separation Station which includes three high-rate washing centrifuges.

FIG. 5 illustrates a Starch-Gluten Separation Station which, by including three stages of high-rate washing centrifuges, accomplishes such thorough washing and thickening that the underflow from the last centrifuge is the final starch product. The need for hydrocyclone washing and thickening stages is entirely eliminated.

In FIG. 5, where possible, equipment and conduits have been identified by the same reference characters as in FIG. 4. The feed slurry enters the first high-rate washing classification centrifuge 61 from the Fiber Washing and Dewatering Station through conduit 62. The gluten-rich overflow from centrifuge 61 passes through conduit 64 for further processing while the starch-rich underflow moves through conduit 66 as feed for centrifuge 67. Overflow from centrifuge 67 is the wash liquid for centrifuge 61, conducted there through conduit 62. Underflow from centrifuge 67 is the feed for centrifuge 75 moving thereto through conduit 69. The overflow of centrifuge 75 is the wash liquid for centrifuge 67 and passes thereto through conduit 65. The underflow of centrifuge 75 exits therefrom through conduit 78 as the final thickened starch product. Wash liquid, which may be fresh water, is provided for centrifuge 75 through conduit 79. Each of the centrifuges 61, 67 and 75 recycle part of the underflow that each generates through their respective recycle lines 63, 68 and 77.

In this three-stage Starch-Gluten Separation Station, just described, the effect achieved is to eliminate the necessity for additional treatment of the centrifuge product in hydrocyclone washing and thickening stages. Of course, it will be understood that the characteristics of the feed slurry under treatment will determine the number of centrifuge stations required to produce the final thickened starch product and, in some cases, more than three centrifuge stages may be needed.

Although the present invention has been described in conjunction with preferred embodiments, it is to be understood that modifications and variations to be resorted to without departing from the spirit and scope of the invention as those skilled in the art will readily understand. Such modifications and variations are considered to be within the purview and scope of the invention and appended claims.

We claim:

1. In the treatment of corn by the corn wet milling process including the stations of:
   A. Steeping and Germ Separation
   B. Fiber Washing and Dewatering
   C. Starch-Gluten Separation and
   D. Starch Washing and Thickening
the improvement in the Starch-Gluten Separation Station which comprises directing the mixed starch-containing feed flow stream having a density of from 6°Be to 12°Be from the attrition mill of Station A and the Fiber Washing Station B directly to a first high wash rate classification centrifuge capable of classifying the feed stream into a gluten-rich overflow stream which includes soluble protein and an underflow starch-rich stream, the flow of wash in said centrifuge being substantially completely countercurrent to the flow of feed solids to effect separation of the gluten and starch components, forwarding the gluten-rich stream to a gluten-thickening centrifuge in which the overflow is process water and the gluten-rich underflow exits the Station for dewatering and further treatment, forwarding the starch-rich underflow stream of said first classification centrifuge to a second high wash rate classification centrifuge wherein the wash, supplied in a wash liquid to draw-off volume ratio in the range of 1 to 2, is countercurrent to flow of feed solids and wherein the overflow stream thereof contains a minor protein component and is in part returned to said first classification centrifuge as wash liquid and in part is returned to the Fiber Washing Station as process water and the starch-rich underflow at a density of from 14°Be to 22°Be is forwarded to the Starch Washing and Thickening Station where it is subjected to treatment in multistage hydrocyclones with the overflow from the hydrocyclone stages injected as wash liquid into said second classification centrifuge and the underflow constituting the starch product.

2. The process of claim 1 wherein said feed slurry has a density of about 7.5°Be.

3. The process of claims 1 or 2 wherein the ratio of the volume of wash liquid to draw-off volume of the centrifuges is about 1.5.

4. In the corn wet milling process wherein an intermediate starch-containing feed stream is produced having a density of from 6°Be to 12°Be, treatment of that feed stream without preliminary thickening directly in at least one high wash rate classification centrifuge wherein wash liquid is introduced into the centrifuge countercurrent to the feed stream in a volume ratio of wash liquid to draw-off volume of at least 1.0 thereby washing the feed stream and classifying it in large part by elutriation into a gluten-rich overflow and a starch-rich underflow stream having a density of from 14°Be to 22°Be with a protein content of less than 0.5% insoluble protein and thereafter subjecting the starch-rich stream to thickening in a series of hydrocyclones wherein the starch underflow attains a density of about 25°Be.

5. The process of claim 4 wherein the ratio of wash liquid volume to centrifuge draw-off volume is about 1.5.

6. In the corn wet milling process wherein an intermediate starch-containing feed stream is produced having a density of from 6°Be to 12°Be, treatment of that feed stream directly in at least one high wash rate classification centrifuge wherein wash liquid is introduced into the centrifuge countercurrent to said feed stream and in a volume ratio of wash liquid to draw-off volume of from 1.0 to 2.0 thereby washing and classifying the feed stream into a gluten-rich overflow and a starch-rich underflow having a density of from 14°Be to 22°Be, and forwarding for underflow for thickening in hydrocyclones.

7. In the process of claim 6 wherein two high wash rate classification centrifuges are provided for operation in series and wash liquid is introduced into each in a volume ratio of about 1.5 with the draw-off volume of the centrifuges, the overflow of the second centrifuge constituting the wash liquid for the first centrifuge and overflow from the hydrocyclones constituting the wash liquid for the second centrifuge.

8. In the corn wet milling process wherein an intermediate starch-containing feed stream is produced having a density of from 6°Be to 12°Be, treatment of that feed stream in a series of three or more high wash rate classification centrifuges wherein wash liquid is introduced into each centrifuge countercurrent to said feed stream and in a volume ratio of wash liquid to draw-off volume of from 1.0 to 2.0 thereby washing and classifying the feed stream into a gluten-rich overflow proceeding from the first of said high wash rate classification centrifuges and a thickened starch-rich underflow having a density of over 14°Be issuing from the last of said series of high wash rate classification centrifuges.

* * * * *